(12) United States Patent
Grundvig et al.

(10) Patent No.: US 9,147,416 B2
(45) Date of Patent: Sep. 29, 2015

(54) SYSTEMS AND METHODS FOR MULTI-HEAD SERVO DATA PROCESSING

(71) Applicant: LSI Corporation, San Jose, CA (US)

(72) Inventors: Jeffrey P. Grundvig, Loveland, CO (US); Richard Rauschmayer, Longmont, CO (US); Yu Liao, Longmont, CO (US); Jin Lu, Lafayette, CO (US); Edward J. D'Avignon, Lakeville, MN (US)

(73) Assignee: Avago Technologies General IP (Singapore) PTE. LTD., Singapore (SG)

( * ) Notice: Subject to any disclaimer, the term of this patent is extended or adjusted under 35 U.S.C. 154(b) by 43 days.

(21) Appl. No.: 14/217,833

(22) Filed: Mar. 18, 2014

(65) Prior Publication Data
US 2015/0243322 A1 Aug. 27, 2015

Related U.S. Application Data

(60) Provisional application No. 61/944,454, filed on Feb. 25, 2014, provisional application No. 61/946,698, filed on Feb. 28, 2014, provisional application No. 61/948,111, filed on Mar. 5, 2014.

(51) Int. Cl.
*G11B 5/48* (2006.01)
*G11B 5/09* (2006.01)
*G11B 5/596* (2006.01)
*G11B 5/39* (2006.01)
*G11B 20/10* (2006.01)

(52) U.S. Cl.
CPC ............... *G11B 5/4886* (2013.01); *G11B 5/09* (2013.01); *G11B 5/3977* (2013.01); *G11B 5/59644* (2013.01); *G11B 5/4866* (2013.01); *G11B 20/10259* (2013.01)

(58) Field of Classification Search
CPC ............ G11B 5/6011; G11B 5/59688; G11B 5/5526; G11B 5/02; G11B 5/488; G11B 5/3912; G11B 5/012; G11B 5/4886; G11B 5/59627; G11B 27/36; G11B 20/1009; G11B 2220/20; G11B 5/09
USPC ......................... 360/39, 31, 48, 51, 53, 77.08
See application file for complete search history.

(56) References Cited

U.S. PATENT DOCUMENTS

| 8,462,455 | B2 * | 6/2013 | Aravind ........................... 360/51 |
| 8,837,068 | B1 * | 9/2014 | Liao et al. ........................ 360/51 |
| 8,861,111 | B1 * | 10/2014 | Liao et al. ........................ 360/39 |
| 8,861,112 | B1 * | 10/2014 | Pan et al. ......................... 360/39 |
| 8,908,305 | B1 * | 12/2014 | Jin et al. .......................... 360/31 |

OTHER PUBLICATIONS

U.S. Appl. No. 14/217,783, Mar. 18, 2014, Grundvig, Jeffrey.
U.S. Appl. No. 14/217,805, Mar. 18, 2014, Grundvig, Jeffrey.
U.S. Appl. No. 14/025,409, filed Sep. 12, 2013, Shaohua Yang, Unpublished.
U.S. Appl. No. 14/483,306, filed Jan. 6, 2014, Lu Pan, Unpublished.

* cited by examiner

*Primary Examiner* — Ali Neyzari
(74) *Attorney, Agent, or Firm* — Hamilton DeSanctis & Cha

(57) ABSTRACT

Systems, methods, devices, circuits for data processing, and more particularly to systems and methods for processing servo data using two or more sensing heads.

20 Claims, 7 Drawing Sheets

SYSTEMS AND METHODS FOR MULTI-HEAD SERVO DATA PROCESSING

CROSS REFERENCE TO RELATED APPLICATIONS

The present application claims priority to (is a non-provisional of) U.S. Pat. App. No. 61/944,454 entitled "Systems and Methods for Multi-Head Servo Data Processing", and filed Feb. 25, 2014 by Grundvig et al.; U.S. Pat. App. No. 61/946,698 entitled "Systems and Methods for Multi-Head Separation Determination", and filed Feb. 28, 2014 by Grundvig et al.; and U.S. Pat. App. No. 61/948,111 entitled "Systems and Methods for Synchronization Hand Shaking in a Storage Device", and filed Mar. 5, 2014 by Grundvig et al. The entirety of all of the aforementioned provisional patent applications is incorporated herein by reference for all purposes.

FIELD OF THE INVENTION

Embodiments are related to systems and methods for data processing, and more particularly to systems and methods for processing servo data using two or more sensing heads.

BACKGROUND

As the density of information stored on a storage medium increases, the use of multiple read heads has been developed to sense and process data from a user data region of a storage medium. In the case of two read heads, the two heads may be located, for example, approximately 100 nm apart in a down track direction. Straight forward data processing using such spacing leads to reasonable processing of user data regions, but results in some advantages and disadvantages in processing data from the servo data regions.

Hence, for at least the aforementioned reasons, there exists a need in the art for advanced systems and methods for processing data derived from servo data regions using multiple read heads.

SUMMARY

Embodiments are related to systems and methods for data processing, and more particularly to systems and methods for processing servo data using two or more sensing heads.

Various embodiments of the present invention provide data processing systems that include a first and second processing circuits. The first input processing circuit is operable to provide a first data set from information received from a first read head. The first data set includes a first instance of a first portion of the information and a first instance of a second portion of the information. The second input processing circuit is operable to provide a second data set from information received from a second read head. The second data set includes a second instance of the first portion of the information and a second instance of the second portion of the information. The system further includes a combining circuit operable to combine an aligned output with the second instance of the first portion to yield a combined signal. The aligned output is derived from the first instance of the first portion of the information. The system additionally includes a first processing circuit operable to process the combined signal to yield a first status output, and a second processing circuit operable to process the first instance of the second portion of the information to yield a second status output.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1a shows a storage system including multi-head servo data processing circuitry in accordance with some embodiments of the present invention;

DETAILED DESCRIPTION OF SOME EMBODIMENTS

Figure 1B:
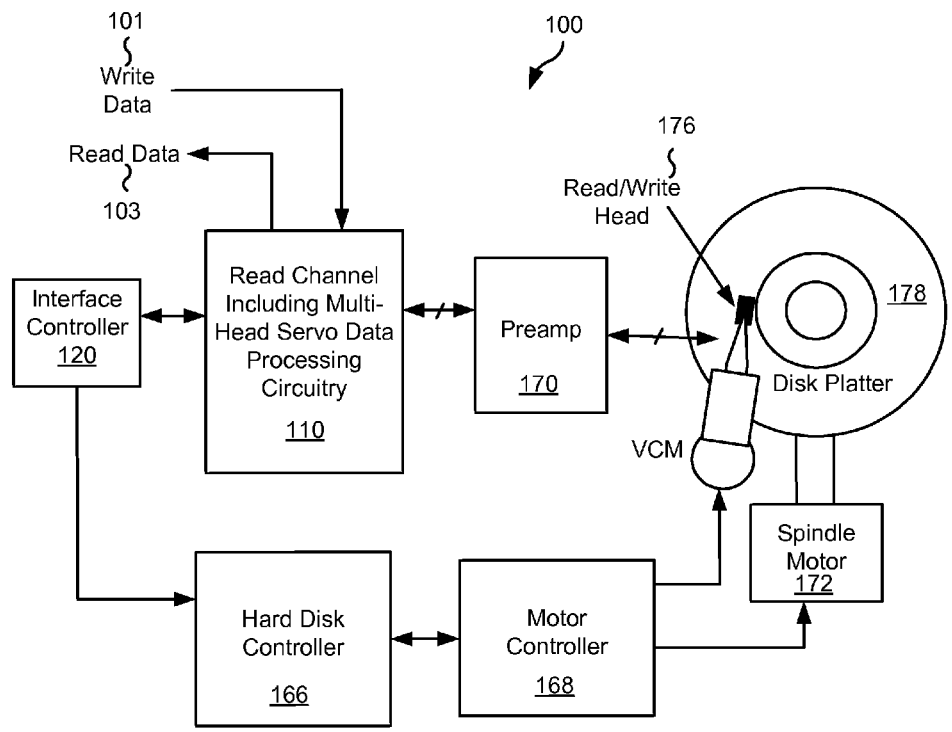
FIG. 1b shows the distribution of multiple read heads and a write head disposed as part of a read/write head assembly that may be used in relation to various embodiments of the present invention.
Figure 1B:
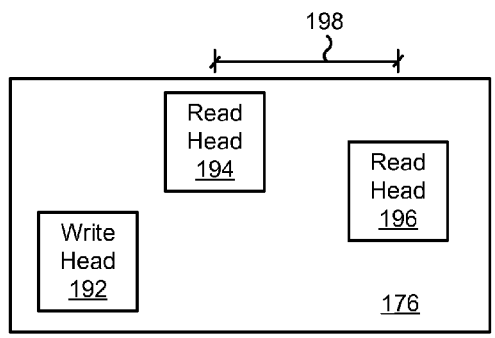

Embodiments are related to systems and methods for data processing, and more particularly to systems and methods for processing servo data using two or more sensing heads.

Various embodiments of the present invention provide data processing systems that include a first and second processing circuits. The first input processing circuit is operable to provide a first data set from information received from a first read head. The first data set includes a first instance of a first portion of the information and a first instance of a second portion of the information. The second input processing circuit is operable to provide a second data set from information received from a second read head. The second data set includes a second instance of the first portion of the information and a second instance of the second portion of the information. The system further includes a combining circuit operable to combine an aligned output with the second instance of the first portion to yield a combined signal. The aligned output is derived from the first instance of the first portion of the information. The system additionally includes a first processing circuit operable to process the combined signal to yield a first status output, and a second processing circuit operable to process the first instance of the second portion of the information to yield a second status output.

Some instances of the aforementioned embodiments include an alignment circuit operable to align the first instance of the first portion of the information and the second instance of the first portion of the information to yield the aligned output. In some cases, the system further includes a first phase detection circuit operable to determine a phase of the first data set; and a second phase detection circuit operable to determine a phase of the second data set. In such cases, the alignment circuit uses a difference between the phase of the first data set and the phase of the second data set. In particular cases, the data processing system includes a phase averaging circuit operable to average the first phase and the second phase to yield an average phase. In such cases, the first processing circuit includes a multi-phase interpolator circuit operable to track a peak of the combined signal based at least in part on the average phase. In one particular case, the first data set and the second data set are derived from a spiral self write servo data on a storage medium.

Other instances of the aforementioned embodiments include a third processing circuit operable to process the second instance of the second portion of the information to yield a third status output. In some cases, the second portion of the information includes a burst field of a servo data set on a storage medium. The third status indicates an alignment of the second read head relative to a track on the storage medium.

In various instances of the aforementioned embodiments, the second portion of the information includes a burst field of a servo data set on a storage medium, and the second status indicates an alignment of the first read head relative to a track on the storage medium. In some instances of the aforementioned embodiments, the first portion of the information includes at least one of a sector address mark, a Gray code, and a repeat run out field. In such instances, the first status output is one of more of: a sector address mark found output, a Gray code output, and a repeat run out output. In one or more instances of the aforementioned embodiments, the first portion of the information includes a sector address mark, the first status output is a first sector address mark found output, and the system further includes a third processing circuit operable to process one of the first data set or the second data set to yield a second sector address mark. In other instances of the aforementioned embodiments, the combining circuit includes a summation circuit operable to add the aligned output to the second instance of the first portion to yield the combined signal.

In one or more instances of the aforementioned embodiments, the data processing system is implemented as part of a storage device. The storage device includes: a storage medium operable to store servo data where the information received from the first read head and the information received from the second read head includes the servo data; and a read/write head assembly disposed in relation to the storage medium. The read/write head assembly includes the first read head and the second read head. In some cases, the servo data is arranged radially across tracks on the storage medium. In other cases, the servo data is arranged spirally across tracks on the storage medium. In various instances of the aforementioned embodiments, the system is implemented as an integrated circuit.

Other embodiments of the present invention provide methods for synchronizing to information on a storage medium. The methods include: receiving a first data set corresponding to information received from a first read head where the first data set includes a first instance of a first portion of the information and a first instance of a second portion of the information; receiving a second data set corresponding to information received from a second read head where the second data set includes a second instance of the first portion of the information and a second instance of the second portion of the information; aligning the first instance of the first portion with the second instance of the first portion using an alignment circuit; combining the aligned first instance of the first portion with the aligned second instance of the second portion to yield a combined signal; processing the combined signal to yield a status output selected from a group consisting of: a sector address mark, a Gray code output, and a repeat run out output; and processing the first instance of the second portion of the information to yield a burst output that indicates an alignment of the first read head relative to a track on a storage medium.

Turning to FIG. 1*a*, a storage system 100 including a read channel circuit 110 having multi-head servo data processing circuitry in accordance with some embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

Figure 1C:
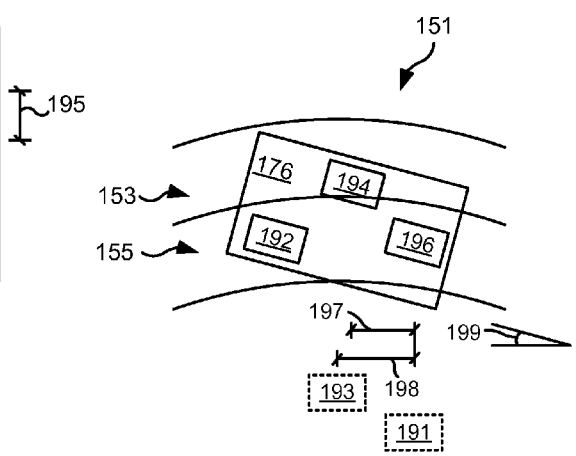
FIG. 1c shows the read/write head assembly disposed in relation to multiple tracks of a storage medium in accordance with some embodiments of the present invention.

In a typical read operation, read/write head assembly 176 is accurately positioned by motor controller 168 over multiple data tracks on disk platter 178. Read/write head assembly 176 includes two or more read heads capable of sensing data from two or more tracks at the same time, or for sensing multiple instances of the same track. An example of read/write assembly 176 is shown in FIG. 1*b* that includes two read heads 194, 196 that are physically separated in a down track direction by a distance 198, and in a cross track direction by a distance 195. Each of read heads 194, 196 are capable of sensing information from disk platter 178. In addition, read/write head assembly 176 includes a write head 192 that is capable of writing data to disk platter 178. FIG. 1*c* shows an example of read/write head assembly 176 disposed in relation to a section 151 of disk platter 178 that includes multiple tracks 153, 155 of disk platter 178. Read/write head assembly 176 exhibits a skew angle 199 relative to tracks 153, 155. As shown, the combination of the location of read/write head assembly 176, skew angle 199 and the cross-track separation of tracks 153, 155 results in read head 194 sensing data from track 153 and read head 196 sensing data track 196. Skew angle 199 results in a reduced distance 197 in the down track separation between read head 194 and read head 196. Reduced distance 197 is shown in relation to distance 198. Dashed boxes 193, 191 represent the relative location of read heads 194, 196 if skew angle 199 is zero. Distance 197 is related to distance 198 by the following equation:

Distance 197=(Distance 198)cos(skew angle 199).

In other cases, the combination of the location of read/write head assembly 176, skew angle 199 and the cross-track separation of tracks 153, 155 results in read head 194 sensing data from the same track. In an typical scenario, skew angle 199 may be assumed to be around fifteen degrees.

Figure 1D:
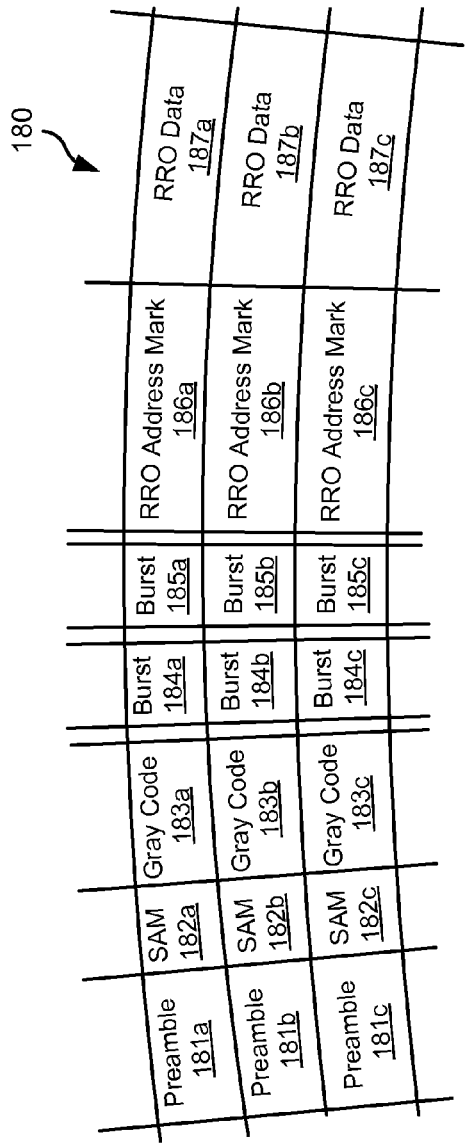
FIG. 1d shows an example of radial distribution of servo data on a storage medium.
Figure 1E:
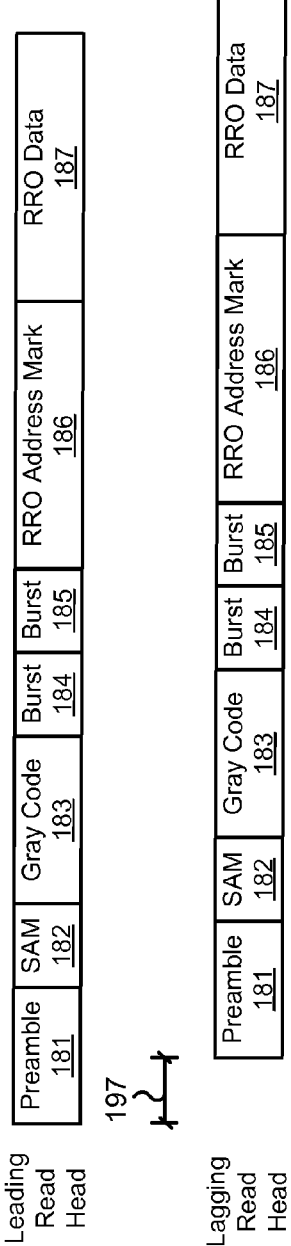
FIG. 1e shows an example of relative timing of servo data derived from two different read heads in accordance with various embodiments of the present invention.

The sensing of different tracks by read head 194 and read head 196 is particularly useful where the servo data is radially distributed across multiple tracks. Turning to FIG. 1d, an example of a section 180 of disk platter 178 is shown where the portions of the servo data is radially distributed. As shown, the servo data includes a preamble 181 followed by a sector address mark (SAM) 182 in the down track direction, followed by a gray code 183 in the down track direction, followed by a first burst 184 in the down track direction, followed by a second burst in the down track direction, followed by a repeatable run out (RRO) address mark 186 in the down track direction, followed by the repeatable run out data 187 in the down track direction. Where read head 194 is sensing data from a different track than read head 196 both heads will be sensing the same portion of the servo data due to the radial distribution shown in FIG. 1d. FIG. 1e shows a timing diagram 188 of data received from read head 194 (i.e., the leading read head) and read head 196 (i.e., the lagging read head). As shown the timing difference between the leading read head and the lagging read head by distance 197 (i.e., the down track distance between read head 194 and read head 196).

Referring again to FIG. 1a, motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent to a desired track of disk platter 178 (e.g., track 155), magnetic signals representing data on the track are sensed by read/write head assembly 176 as disk platter 178 is rotated by spindle motor 172. The stream of sensed magnetic signals are provided as a continuous, minute analog signal representative of the magnetic data on the track of disk platter 178. This stream of minute analog signals is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signals to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

During a read of data from disk platter 178, data is received from read head 194 and read head 196. The data from each of read head 194 and read head 196 are used to process the received servo data. In some portions, realigned data from read head 194 and read head 196 is averaged, with the averaged data being used for processing. Such an approach reduces the impact of some types of noise occurring in one data stream, but not the other. Other portions of the servo data are not averaged, but rather are processed separately. The processing of the data from read head 194 and read head 196 may be done using a system similar to one of those discussed below in relation to FIGS. 2-5, and/or may use a method similar to one of those discussed below in relation to FIG. 6.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

In a servo system accurately detecting the servo address mark (SAM) is a critical function as it is used to locate and process the other servo fields and also for placing the subsequent user data events. Therefore, having a low SAM miss rate as well as low SAM false rate is important. Furthermore having a low error rate for detecting the Gray code and RRO fields of the servo information is also important. The SAM and Gray servo fields are particularly adept to potential benefits from a multiple heads since unlike user data or RRO, these fields are continuous across the stroke where both heads should be reading the same information regardless of their cross track separation with the possible exception of a limited number of bits that may change from track to track.

Figure 2:
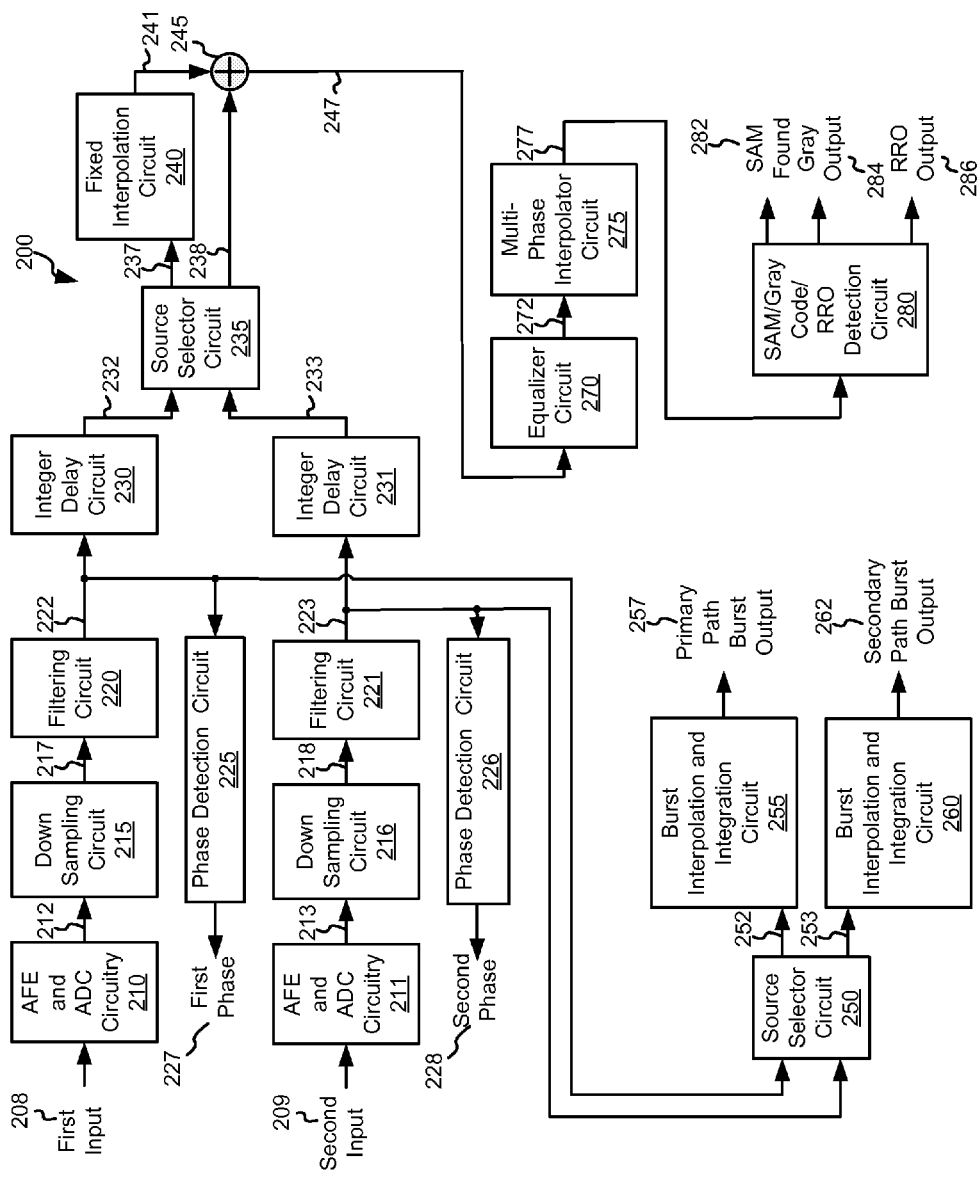
FIG. 2 shows a system for processing servo data derived from two heads including a single multi-phase interpolator circuit in accordance with some embodiments of the present invention.

One method to improve the overall signal quality is to average the sensed information derived from different read heads. Such averaging tends to reduce the impact of noise occurring in one of the sensed signals (i.e., uncorrelated noise). This averaging is applied to the processing of the SAM/Gray Code/RRO fields, but is not applied to processing the burst data. Such averaging would not enhance the processing of the burst data, but would rather reduce the information available from the burst fields. Turning to FIG. 2, a system 200 for processing servo data derived from two heads including a single multi-phase interpolator circuit is shown in accordance with some embodiments of the present invention.

As shown, system 200 includes analog front end and analog to digital conversion circuitry 210 that receives a first input 208 (i.e., an input from a first read head) and provides corresponding digital samples 212. The analog front end circuitry processes first input 208 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 212 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 212 are provided to a down sampling circuit 215.

Down sampling circuit 215 down samples digital samples 212 to yield a down sampled output 217. In some embodiments of the present invention, the down sampling is a 2× down sampling. Down sampling circuit 215 may implement any approach known in the art for down sampling an input data set. Down sampled output 217 is provided to a filtering circuit 220 that applies a low pass digital filtering algorithm to the input to yield a sampled output 222. In some embodiments of the present invention, the down sampling and the low pass digital filtering algorithm are applied by the same circuit (i.e., a combination of down sampling circuit 215 and filtering circuit 220).

Filtered output 222 is provided to both an integer delay circuit 230 and a phase detection circuit 225. Phase detection circuit 225 detects a phase of filtered output 222, and provides the detected phase as a first phase 227. Phase detection circuit 225 may be any circuit known in the art that is capable of identifying the phase of a digital signal. Based upon the disclosure provided herein, one of ordinary skill in the art will recognize a variety of phase detection circuits that may be used in relation to different embodiments of the present invention. Integer delay circuit 230 delays filtered output 222 by a first delay to yield a first delayed output 232.

Similarly, system 200 includes analog front end and analog to digital conversion circuitry 211 that receives a second input 209 (i.e., an input from a second read head) and provides corresponding digital samples 213. The analog front end circuitry processes second input 209 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 213 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 213 are provided to a down sampling circuit 216.

Down sampling circuit 216 down samples digital samples 213 to yield a down sampled output 218. In some embodiments of the present invention, the down sampling is a 2× down sampling. Down sampling circuit 216 may implement any approach known in the art for down sampling an input data set. Down sampled output 218 is provided to a filtering circuit 221 that applies a low pass digital filtering algorithm to the input to yield a sampled output 223. In some embodiments of the present invention, the down sampling and the low pass digital filtering algorithm are applied by the same circuit (i.e., a combination of down sampling circuit 216 and filtering circuit 221).

Filtered output 223 is provided to both an integer delay circuit 231 and a phase detection circuit 226. Phase detection circuit 226 detects a phase of filtered output 223, and provides the detected phase as a first phase 228. Phase detection circuit 223 may be any circuit known in the art that is capable of identifying the phase of a digital signal. Based upon the disclosure provided herein, one of ordinary skill in the art will recognize a variety of phase detection circuits that may be used in relation to different embodiments of the present invention. Integer delay circuit 231 delays filtered output 223 by a second delay to yield a second delayed output 233.

The first delay and the second delay are chosen such that first delayed output 232 and second delayed output 233 are aligned within one sampling period. Selection of the first delay and the second delay are based at least in part on the down track distance between a read head providing first input 208 and a read head providing second output 209. In some cases, integer delay circuit 231 may be eliminated and all adjustment to align first delayed output 232 with second delayed output 233 being done by integer delay circuit 230. Such an approach assumes that first input 208 is guaranteed to come from a leading read head (e.g., read head 194) and second input 209 is guaranteed to come from a lagging read head (e.g., read head 196).

A source selector circuit 235 selects one of first delayed output 232 or first delayed output 233 as having a leading phase relative to the phase of the other. Determination of the relative phase status of first delayed output 232 and second phase output 233 is determined by comparing first phase 227 with second phase 228. Source selector circuit 235 provides the one of first delayed output 232 or second delayed output 233 with the leading fractional phase (i.e., a fractional difference in phase) as a leading phase output 237, and provides the other of first delayed output 232 or second delayed output 233 as a lagging phase output 238. Leading phase output 237 is provided to a fixed interpolation circuit 240 that interpolates the input by a phase shift amount to yield an aligned output 241. The phase shift amount is the magnitude of the difference between first phase 227 and second phase 228. Fixed interpolation circuit 240 may be any circuit known in the art that is capable of interpolating an input to yield a phase modified output.

Aligned output 241 is added to lagging phase output 238 by a summation circuit 245 to yield an aggregated output 247. Such summation effectively averages first input 208 with second input 209 and thereby reduces the effect of any uncorrelated noise evident on one or the other of lagging phase output 238 and aligned output 241. Aggregated output 247 is provided to an equalizer circuit 270 that applies an equalization algorithm to the input to yield an equalized output 272. In some embodiments of the present invention, equalizer circuit 270 is a digital finite impulse response circuit as is known in the art.

Equalized output 272 is provided to a multi-phase interpolator circuit 275 to yield a peak output 277. In one particular embodiment of the present invention, multi-phase interpolator circuit 275 is an eight phase interpolator circuit that compares eight phases for each sampling period of the analog to digital conversion circuitry and determines which of the phases yields a peak amplitude of the preamble data. The phase yielding the peak amplitude of the preamble data is provided as peak output 277. Peak output 277 is processed by a processing circuit 280. Processing circuit 280 queries peak output 277 to yield a SAM Found signal 282 corresponding to the location of a sector address mark in peak output 277, processes peak output 277 to yield a Gray output 284, and processes peak output 277 to yield an output 286. Processing to yield SAM found signal 282, Gray output 284, and repeat run out (RRO) output 286 may be done using any processing circuit known in the art that is capable of processing respective portions of servo data corresponding to a sector address mark, gray code, and repeat run out data.

System 200 additionally includes a source selector circuit 250 that selects one of sampled output 222 or sampled output 223 as a leading output 252, and the other of sampled output 222 or sampled output 223 as a lagging output 253. The selection applied by source selector circuit 250 corresponds to the selection made by source selector circuit 235. In particular, where source selector circuit 235 selects first delayed output 232 corresponding to first input 208 as leading phase output 237, source selector circuit 250 selects sampled output 222 corresponding to first input 208 as leading output 252. Alternatively, where source selector circuit 235 selects second delayed output 233 corresponding to second input 209 as leading phase output 238, source selector circuit 250 selects sampled output 223 corresponding to second input 209 as leading output 253.

A burst interpolation and integration circuit 255 applies burst interpolation and integration processing to generate a primary path burst output 257. The burst processing may be performed using any circuit known in the art for processing burst information from servo data. Another burst interpolation and integration circuit 260 applies the same synchronization and burst processing applied by burst interpolation and integration circuit 255 to generate a secondary path burst output 262. Again, the burst processing may be performed using any circuit known in the art for processing burst information from servo data. As the burst data is used to indicate an offset from a centerline of a track, averaging data sets derived from different offsets from the centerline effectively undermines the burst data. For this reason, the burst processing is performed on independent data sets derived from respective ones of first input 208 and second input 209, and results in independent burst outputs. Primary path burst output 257 and secondary path burst output 262 are provided to a host (not shown) that uses the information to adjust the location of a read/write head assembly (not shown) relative to sensed tracks (not shown). It should be noted that while the embodiment shows data path independent burst processing that other embodiments of the present invention may provide for the two burst integration/interpolation phases to be set using an averaged phase from the two heads along with the head offset estimate to set them differently but dependent on both the averaged phase and the offset estimate.

While system 200 includes fixed interpolation circuit 240 operable to do fractional phase alignment, such fractional phase alignment may not provide enhanced performance when compared with averaging of signals only aligned on an integer basis. In such cases, fixed interpolation circuit 240 may be removed and leading phase output 237 directly added to lagging phase output 238. In some embodiments of the present invention, in a 2x oversampled servo architecture, data derived from first input 208 and second input 209 may apply the averaging in the 2x domain (i.e., pre-down sampled domain).

Figure 3:
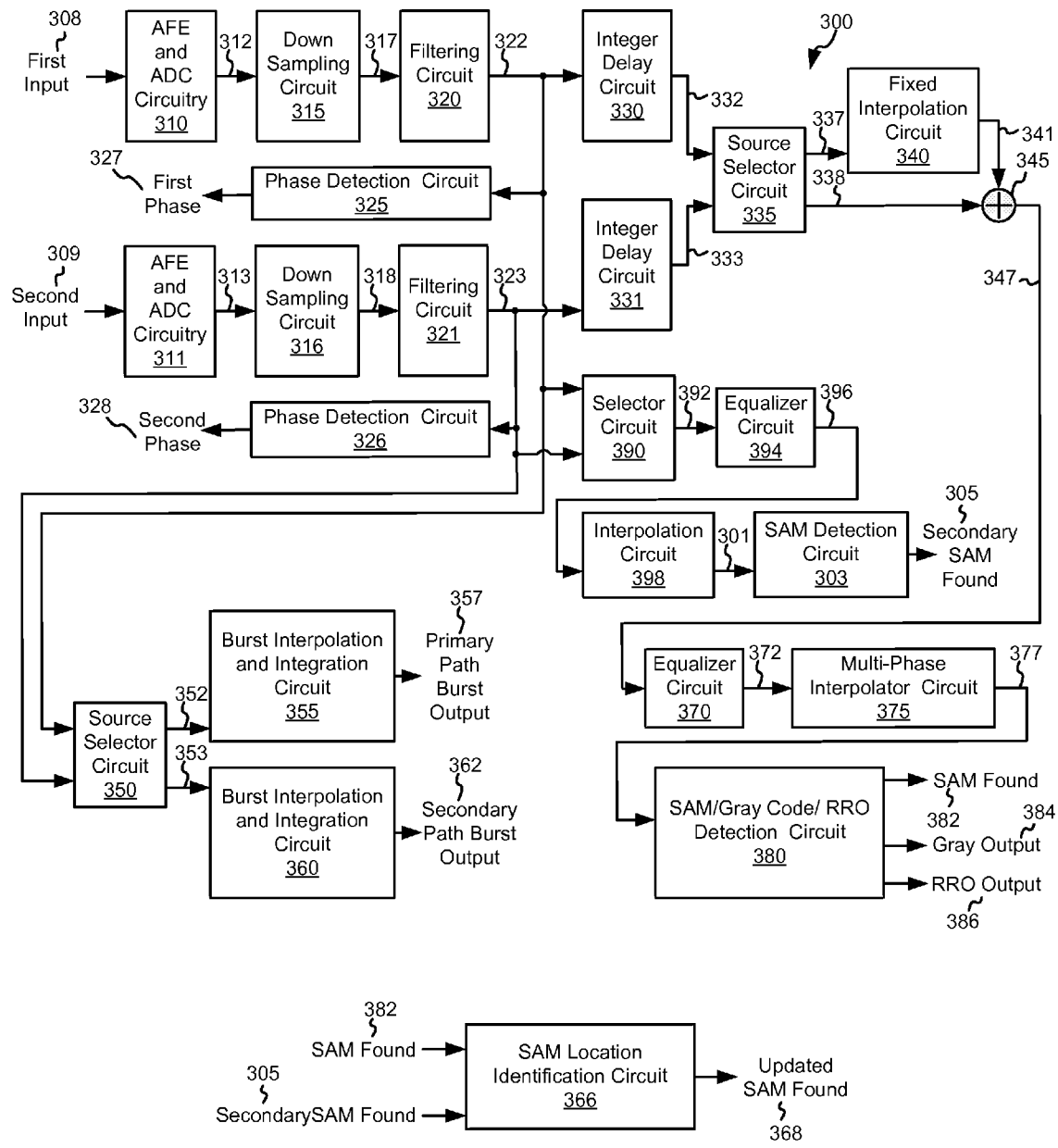
FIG. 3 depicts another system for processing servo data derived from two heads including a single multi-phase interpolator circuit and two SAM detection circuits in accordance with other embodiments of the present invention.

Sector address mark detection may be further enhanced through use of independent SAM detection circuitry operable to detect a sector address mark operating on an independent input derived from one of multiple read heads. Two different SAM found outputs are used to determine a most accurate location of the sector address mark of the servo data. Turning to FIG. 3, another system 300 for processing servo data derived from two heads including a single multi-phase interpolator circuit and two SAM detection circuits is shown in accordance with other embodiments of the present invention.

As shown, system 300 includes analog front end and analog to digital conversion circuitry 310 that receives a first input 308 (i.e., an input from a first read head) and provides corresponding digital samples 312. The analog front end circuitry processes first input 308 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 312 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 312 are provided to a down sampling circuit 315.

Down sampling circuit 315 down samples digital samples 312 to yield a down sampled output 317. In some embodiments of the present invention, the down sampling is a 2x down sampling. Down sampling circuit 315 may implement any approach known in the art for down sampling an input data set. Down sampled output 317 is provided to a filtering circuit that applies a low pass digital filtering algorithm to the input to yield a sampled output 322. In some embodiments of the present invention, the down sampling and the low pass digital filtering algorithm are applied by the same circuit (i.e., a combination of down sampling circuit 315 and filtering circuit 320).

Filtered output 322 is provided to both an integer delay circuit 330 and a phase detection circuit 325. Phase detection circuit 325 detects a phase of filtered output 322, and provides the detected phase as a first phase 327. Phase detection circuit 325 may be any circuit known in the art that is capable of identifying the phase of a digital signal. Based upon the disclosure provided herein, one of ordinary skill in the art will recognize a variety of phase detection circuits that may be used in relation to different embodiments of the present invention. Integer delay circuit 330 delays filtered output 322 by a first delay to yield a first delayed output 332.

Similarly, system 300 includes analog front end and analog to digital conversion circuitry 311 that receives a second input 309 (i.e., an input from a second read head) and provides corresponding digital samples 313. The analog front end circuitry processes second input 309 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 313 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 313 are provided to a down sampling circuit 316.

Down sampling circuit 316 down samples digital samples 313 to yield a down sampled output 318. In some embodiments of the present invention, the down sampling is a 2× down sampling. Down sampling circuit 316 may implement any approach known in the art for down sampling an input data set. Down sampled output 318 is provided to a filtering circuit that applies a low pass digital filtering algorithm to the input to yield a sampled output 323. In some embodiments of the present invention, the down sampling and the low pass digital filtering algorithm are applied by the same circuit (i.e., a combination of down sampling circuit 316 and filtering circuit 321).

Filtered output 323 is provided to both an integer delay circuit 331 and a phase detection circuit 326. Phase detection circuit 326 detects a phase of filtered output 323, and provides the detected phase as a first phase 328. Phase detection circuit 323 may be any circuit known in the art that is capable of identifying the phase of a digital signal. Based upon the disclosure provided herein, one of ordinary skill in the art will recognize a variety of phase detection circuits that may be used in relation to different embodiments of the present invention. Integer delay circuit 331 delays filtered output 323 by a second delay to yield a second delayed output 333.

The first delay and the second delay are chosen such that first delayed output 332 and second delayed output 333 are aligned within one sampling period. Selection of the first delay and the second delay are based at least in part on the down track distance between a read head providing first input 308 and a read head providing second output 309. In some cases, integer delay circuit 331 may be eliminated and all adjustment to align first delayed output 332 with second delayed output 333 being done by integer delay circuit 330. Such an approach assumes that first input 308 is guaranteed to come from a leading read head (e.g., read head 194) and second input 309 is guaranteed to come from a lagging read head (e.g., read head 196).

A source selector circuit 335 selects one of first delayed output 332 or first delayed output 333 as having a leading phase relative to the phase of the other. Determination of the relative phase status of first delayed output 332 and second phase output 333 is determined by comparing first phase 327 with second phase 328. Source selector circuit 335 provides the one of first delayed output 332 or second delayed output 333 with the leading fractional phase (i.e., a fractional difference in phase) as a leading phase output 337, and provides the other of first delayed output 332 or second delayed output 333 as a lagging phase output 338. Leading phase output 337 is provided to a fixed interpolation circuit 340 that interpolates the input by a phase shift amount to yield an aligned output 341. The phase shift amount is the magnitude of the difference between first phase 327 and second phase 328. Fixed interpolation circuit 340 may be any circuit known in the art that is capable of interpolating an input to yield a phase modified output.

Aligned output 341 is added to lagging phase output 338 by a summation circuit 345 to yield an aggregated output 347. Such summation effectively averages first input 308 with second input 309 and thereby reduces the effect of any uncorrelated noise evident on one or the other of lagging phase output 338 and aligned output 341. Aggregated output 347 is provided to an equalizer circuit 370 that applies an equalization algorithm to the input to yield an equalized output 372. In some embodiments of the present invention, equalizer circuit 370 is a digital finite impulse response circuit as is known in the art.

Equalized output 372 is provided to a multi-phase interpolator circuit 375 to yield a peak output 377. In one particular embodiment of the present invention, multi-phase interpolator circuit 375 is an eight phase interpolator circuit that compares eight phases for each sampling period of the analog to digital conversion circuitry and determines which of the phases yields a peak amplitude of the preamble data. The phase yielding the peak amplitude of the preamble data is provided as peak output 377. Peak output 377 is processed by a processing circuit 380. Processing circuit 380 queries peak output 377 to yield a SAM Found signal 382 corresponding to the location of a sector address mark in peak output 377, processes peak output 377 to yield a Gray output 384, and processes peak output 377 to yield an output 386. Processing to yield SAM found signal 382, Gray output 384, and repeat run out (RRO) output 386 may be done using any processing circuit known in the art that is capable of processing respective portions of servo data corresponding to a sector address mark, gray code, and repeat run out data.

System 300 additionally includes a source selector circuit 350 that selects one of sampled output 322 or sampled output 323 as a leading output 352, and the other of sampled output 322 or sampled output 323 as a lagging output 353. The selection applied by source selector circuit 350 corresponds to the selection made by source selector circuit 335. In particular, where source selector circuit 335 selects first delayed output 332 corresponding to first input 308 as leading phase output 337, source selector circuit 350 selects sampled output 322 corresponding to first input 308 as leading output 352. Alternatively, where source selector circuit 335 selects second delayed output 333 corresponding to second input 309 as leading phase output 338, source selector circuit 350 selects sampled output 323 corresponding to second input 309 as leading output 353.

A burst interpolation and integration circuit 355 applies burst interpolation and integration processing to generate a primary path burst output 357. The burst processing may be performed using any circuit known in the art for processing burst information from servo data. Another burst interpolation and integration circuit 360 applies the same synchronization and burst processing applied by burst interpolation and integration circuit 355 to generate a secondary path burst output 362. Again, the burst processing may be performed using any circuit known in the art for processing burst information from servo data. As the burst data is used to indicate an offset from a centerline of a track, averaging data sets derived from different offsets from the centerline effectively undermines the burst data. For this reason, the burst processing is performed on independent data sets derived from respective ones of first input 308 and second input 309, and results in independent burst outputs. Primary path burst output 357 and secondary path burst output 362 are provided to a host (not shown) that uses the information to adjust the location of a read/write head assembly (not shown) relative to sensed tracks (not shown). It should be noted that while the embodiment shows data path independent burst processing that other embodiments of the present invention may provide for the two burst integration/interpolation phases to be set using an averaged phase from the two heads along with the head offset estimate to set them differently but dependent on both the averaged phase and the offset estimate.

Additionally, system 300 includes secondary sector address mark detection circuitry that includes a selector circuit 390, an equalizer circuit 394, and interpolation circuit 398, and a SAM detection circuit 303. Selector circuit 390 selects one of sampled output 322 or sampled output 323 as a secondary SAM output 392. The selection applied by selector circuit 390 may be made consistent with the selection applied by source selector circuit 335. In particular, where source selector circuit 335 selects first delayed output 332 corresponding to first input 308 as leading phase output 337, selector circuit 390 selects sampled output 322 corresponding to first input 308 as secondary SAM output 392. Alternatively, where source selector circuit 335 selects second delayed output 333 corresponding to second input 309 as leading phase output 338, selector circuit 390 selects sampled output 323 corresponding to second input 309 as secondary SAM output 392. In other embodiments, one of sampled output 322 or sampled output 323 may be selected as secondary SAM output 392 based upon another selection criteria.

An equalizer circuit 394 applies an equalization algorithm to secondary SAM output 392 to yield an equalized output 396. In some embodiments, equalizer circuit 394 is a digital finite impulse response circuit as is known in the art. Equalized output 396 is provided to an interpolator circuit 398 that is operable to interpolate equalizer output 396 to yield an interpolated output 301. The interpolation operates to interpolate equalized input 396 to correspond to the peaks of the preamble of the received data samples. Interpolator circuit 398 may be implemented using a multi-phase interpolator circuit similar to multi-phase interpolator circuit 375. Based upon the disclosure provided herein, one of ordinary skill in the art will recognize a variety of interpolation algorithms that may be used in relation to different embodiments of the present invention. Interpolated output 301 is provided to a SAM detection circuit 303. SAM detection circuit 303 applies a sector address mark detection to interpolated output 301 to yield a secondary SAM found output 305. SAM detection circuit 303 may be any circuit known in the art that is capable of detecting a sector address mark in a servo data stream.

SAM found 382 and secondary SAM found output 305 are provided to a SAM location identification circuit 366. SAM location identification circuit 366 compares SAM found 382 with secondary SAM found output 305 to determine whether they indicate different locations for the sector address mark in the servo data. Where the same locations of the sector address mark are indicated by the comparison of SAM found 382 and secondary SAM found output 305, SAM found 382 is provided as an updated SAM found 368. Alternatively, where different locations of the sector address mark are indicated by the comparison of SAM found 382 and secondary SAM found output 305, one of SAM found 382 or secondary SAM found output 305 is selected as updated SAM found 368. For example, one of SAM found 382 or secondary SAM found output 305 that indicates a location closest to where the sector address mark was expected in the servo data may be selected and provided as updated SAM found 368 and used as the location of the sector address mark. Alternatively, each of processing circuit 380 and SAM detection circuit 303 may be modified to generate a SAM quality indicator, and the one of SAM found 382 or secondary SAM found output 305 that exhibits the highest quality is provided as updated SAM found 368. The quality may be based upon one or more of the following: a number of bits in SAM found 382 and secondary SAM found output 305 that are in error. If the sector address mark detection utilizes Viterbi algorithm detection, the Viterbi metrics may be used to select the highest quality sector address mark indicated by SAM found 382 and secondary SAM found output 305. Alternatively, flawscan and/or quality of preamble field may be used to select one of SAM found 382 or secondary SAM found output 305 as updated SAM found 368.

Even if two independent SAM detection circuits are included as shown in the embodiment of FIG. 3, the GRAY code bit error rate and potentially the RRO bit error rate may still be improved by combining the two signals such as through simply averaging as was previously discussed. In addition to a simple averaging circuit which could be used to combine the two signal paths, further improvement could be achieved through a more intelligent signal combining circuit. For example since one head will likely be a better quality head with better signal to noise ratio than the other rather than averaging both signals with equal weight the better quality signal could be given greater weight when combining.

Figure 4:
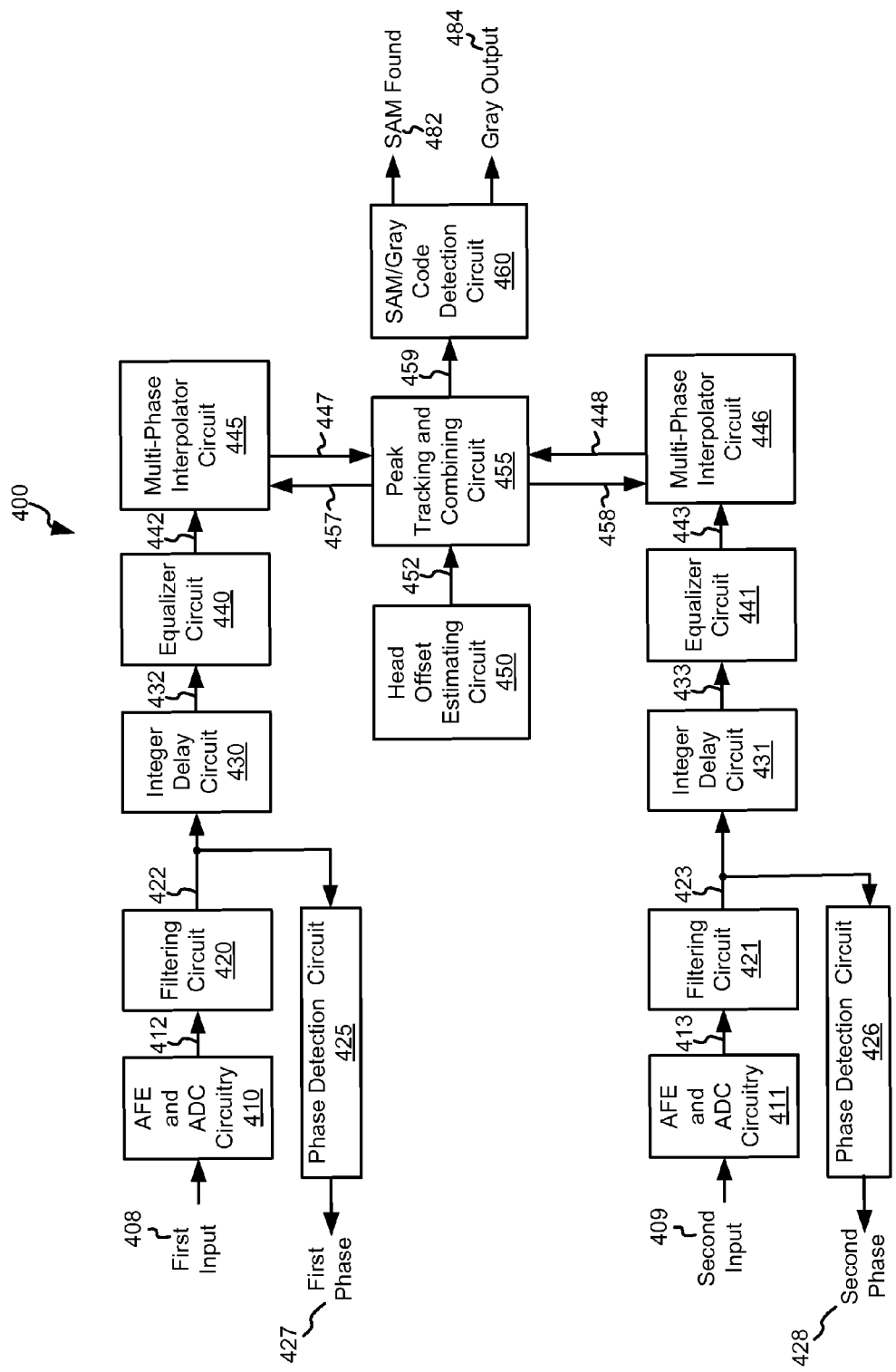
FIG. 4 shows yet another system for processing servo data derived from two heads including a multi-phase interpolator circuits associated with each of the two heads in accordance with various embodiments of the present invention.

Turning to FIG. 4, another system 400 for processing servo data derived from two heads including a multi-phase interpolator circuits associated with each of the two heads is shown in accordance with various embodiments of the present invention. As shown, system 400 includes analog front end and analog to digital conversion circuitry 410 that receives a first input 408 (i.e., an input from a first read head) and provides corresponding digital samples 412. The analog front end circuitry processes first input 408 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 412 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 412 are provided to a filtering circuit 420 that applies a digital low pass filtering algorithm to the input to yield a filtered output 422.

Filtered output 422 is provided to both an integer delay circuit 430 and a phase detection circuit 425. Phase detection circuit 425 detects a phase of filtered output 422, and provides the detected phase as a first phase 427. Phase detection circuit 425 may be any circuit known in the art that is capable of identifying the phase of a digital signal. Based upon the disclosure provided herein, one of ordinary skill in the art will recognize a variety of phase detection circuits that may be used in relation to different embodiments of the present invention. Integer delay circuit 430 delays filtered output 422 by a first delay to yield a first delayed output 432.

First delayed output 432 is provided to an equalizer circuit 440 that applies an equalization algorithm to the input to yield an equalized output 442. In some embodiments of the present invention, equalizer circuit 440 is a digital finite impulse response circuit as is known in the art. Equalized output 442 is provided to a multi-phase interpolator circuit 445 that interpolates the input to yield interpolated phases as a phase output 447. In one particular embodiment of the present invention, multi-phase interpolator circuit 445 is an eight phase interpolator circuit that yields eight values for each phase of a received signal, and provides the phases as a phase output 447 to a peak tracking and combining circuit 455.

Similarly, system 400 includes analog front end and analog to digital conversion circuitry 411 that receives a second input 409 (i.e., an input from a second read head) and provides corresponding digital samples 413. The analog front end circuitry processes second input 409 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 413 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 413 are provided to a filtering circuit 421 that applies a digital low pass filtering algorithm to the input to yield a filtered output 423.

Filtered output 423 is provided to both an integer delay circuit 431 and a phase detection circuit 426. Phase detection circuit 426 detects a phase of filtered output 423, and provides the detected phase as a second phase 428. Phase detection circuit 426 may be any circuit known in the art that is capable of identifying the phase of a digital signal. Based upon the disclosure provided herein, one of ordinary skill in the art will recognize a variety of phase detection circuits that may be used in relation to different embodiments of the present invention. Integer delay circuit 431 delays filtered output 423 by a second delay to yield a second delayed output 433.

Second delayed output 433 is provided to an equalizer circuit 441 that applies an equalization algorithm to the input to yield an equalized output 443. In some embodiments of the present invention, equalizer circuit 441 is a digital finite impulse response circuit as is known in the art. Equalized output 443 is provided to a multi-phase interpolator circuit 446 that interpolates the input to yield interpolated phases as a phase output 448. In one particular embodiment of the present invention, multi-phase interpolator circuit 446 is an eight phase interpolator circuit that yields eight values for each phase of a received signal, and provides the phases as a phase output 448 to peak tracking and combining circuit 455.

A head offset estimating circuit 450 estimates the distance between the read head (not shown) from which first input 408 is derived and the read head (not shown) from which second input 409 is derived. A resulting offset distance 452 is provided to peak tracking and combining circuit 455. The aforementioned offset estimate may be made using any approach known in the art. For example, in one embodiment of the present invention, offset distance 452 is calculated by subtracting first phase 426 from second phase 428 (the integer distance between the two signal sets was already compensated by the difference between the first delay used by integer delay circuit 430 and the second delay used by integer delay circuit 431). Peak tracking and combining circuit 455 selects the best phase from each of phase output 447 and phase output 448 and provides a best phase indicator 457, 458 to respective multi-phase interpolator circuits 445, 446. In addition, peak tracking and combining circuit 455 interpolates either of the best phase from phase output 447 or the best phase from phase output 448 to account for offset distance 452, and thus aligning the selected phase from phase output 447 with the selected phase from phase output 448. Peak tracking and combining circuit 455 sums the aligned instances of phase output 447 and phase output 448 to yield an aligned sum output 459.

Aligned sum output 459 is provided to a processing circuit 460. Processing circuit 460 queries aligned sum output 459 to yield a SAM Found signal 482 corresponding to the location of a sector address mark in aligned sum output 459, and aligned sum output 459 to yield a Gray output 484. Processing to yield SAM found signal 482 and Gray output 484 may be done using any processing circuit known in the art that is capable of processing respective portions of servo data corresponding to a sector address mark and the gray code.

The aforementioned architecture provides peak tracking (i.e., phase tracking) on the combined peak values. To do this, two instances of the multi-phase interpolator circuit are used (i.e., one for each path). The peak tracking decisions are performed based on a combined average of the two signal streams. Since the two peak tracking interpolation filters are both rotating the phase of their respective signal paths to sample on the peaks of the wide-biphase encoded symbols they will naturally output the same phase as is needed to sum the two signal streams together.

It should be noted that in any of the embodiments discussed above in relation to FIGS. 2-4, the ability to perform averaging on some servo fields but not others may be included in the circuitry. For example, a user may wish to average or combine the two signals for Gray code detection but not for repeat run out. Since repeat run out is not a continuous field across the stroke like the sector address mark and GRAY code it may be that on some tracks the averaging will help for repeat run out, but not for others. For example near the outer diameter of a disk platter or an inner diameter of the disk platter where the two heads are likely to have the maximum cross track separation it could be that one of the heads will not come in contact with the repeat run out field and therefore it would only contribute noise to the detection.

During spiral self servo write the concentric position or timing of when to write as well as the radial head position is controlled by reading and processing spiral waveforms in order to correctly position and time the write events in order to write the final concentric servo tracks across the disk surface in the correct locations. There are two fundamental measurements which the channel makes over the spiral waveform which it in turn provides to the controller to facilitate the servo self write process. The first fundamental measurement is the position and phase of the multiple SAM patterns which appear during a spiral event. The second fundamental measurement is the position or location of where the spiral waveform reaches its peak amplitude. In particular, the channel provides burst amplitude information for several burst integration windows which span across the spiral event. An example of spiral measurement is set forth in U.S. Pat. No. 8,498,072 entitled "Systems and methods for spiral waveform detection" and filed on Nov. 29, 2010. The entirety of the aforementioned reference is incorporated herein by reference for all purposes.

When two or more read heads are measuring the spiral signal there is an opportunity to improve the quality of both of these measurements for spiral events. For example since the two read heads will typically be located at slightly different radial positions they will intersect the spiral track at slight different positions and will therefore produce signals which will have largely uncorrelated noise. Therefore the firmware can read the burst measurements from both heads and use this to arrive at a better peak estimate than would be possible with just one read head.

Figure 5:
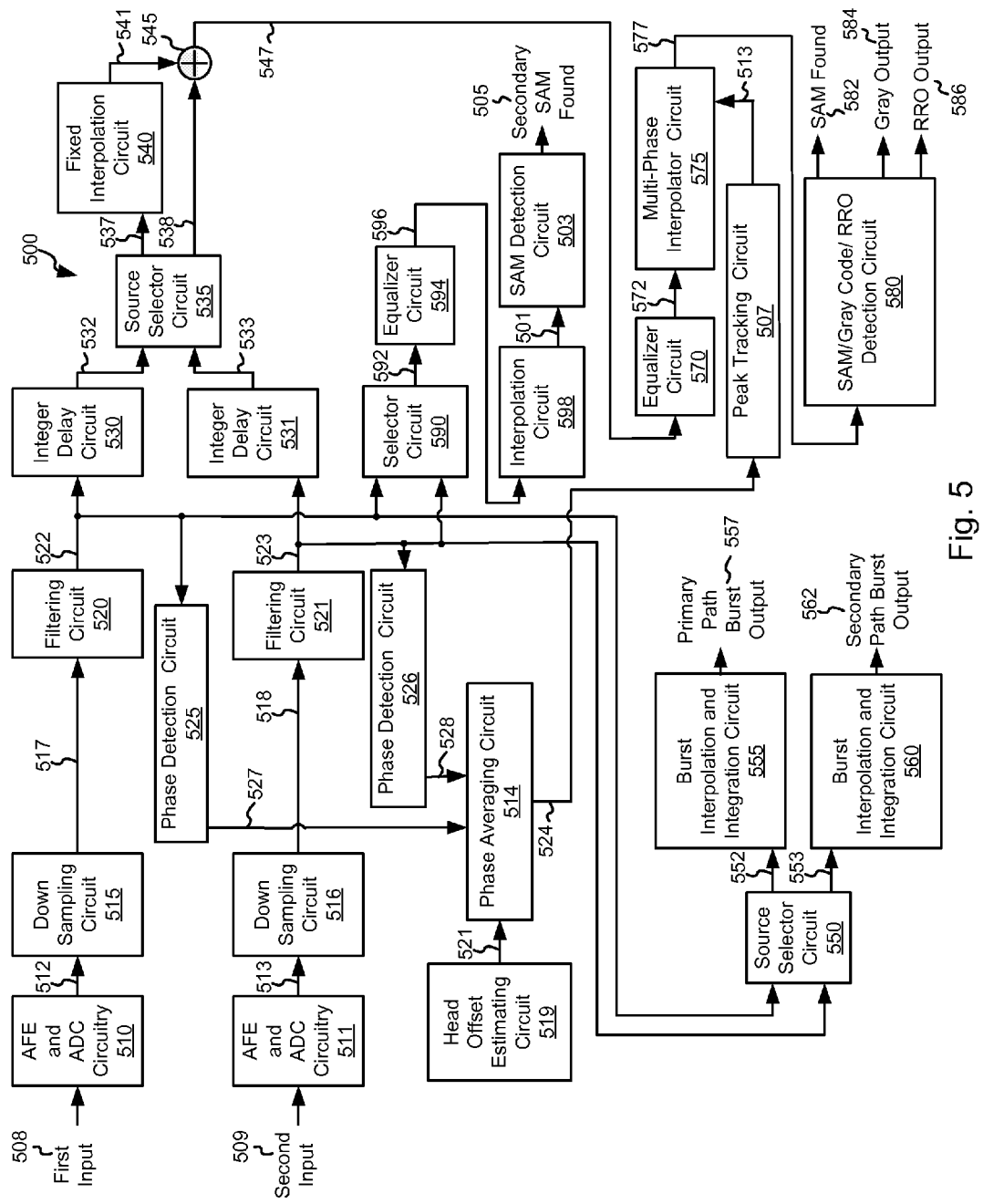
FIG. 5 depicts yet a further system for processing servo data derived from two heads for use in relation to spiral self servo write in accordance with one or more embodiments of the present invention.

Turning to FIG. 5, a system 500 is shown and is used for processing servo data derived from two heads for use in relation to spiral self servo write in accordance with one or more embodiments of the present invention. As shown, system 500 includes analog front end and analog to digital conversion circuitry 510 that receives a first input 508 (i.e., an input from a first read head) and provides corresponding digital samples 512. The analog front end circuitry processes first input 508 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 512 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 512 are provided to a down sampling circuit 515.

Down sampling circuit 515 down samples digital samples 512 to yield a down sampled output 517. In some embodiments of the present invention, the down sampling is a 2× down sampling. Down sampling circuit 515 may implement any approach known in the art for down sampling an input data set. Down sampled output 517 is provided to a filtering circuit that applies a low pass digital filtering algorithm to the input to yield a sampled output 522. In some embodiments of the present invention, the down sampling and the low pass digital filtering algorithm are applied by the same circuit (i.e., a combination of down sampling circuit 515 and filtering circuit 520).

Filtered output 522 is provided to both an integer delay circuit 530 and a phase detection circuit 525. Phase detection circuit 525 detects a phase of filtered output 522, and provides the detected phase as a first phase 527. Phase detection circuit 525 may be any circuit known in the art that is capable of identifying the phase of a digital signal. Based upon the disclosure provided herein, one of ordinary skill in the art will recognize a variety of phase detection circuits that may be used in relation to different embodiments of the present invention. Integer delay circuit 530 delays filtered output 522 by a first delay to yield a first delayed output 532.

Similarly, system 500 includes analog front end and analog to digital conversion circuitry 511 that receives a second input 509 (i.e., an input from a second read head) and provides corresponding digital samples 513. The analog front end circuitry processes second input 509 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 513 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 513 are provided to a down sampling circuit 516.

Down sampling circuit 516 down samples digital samples 513 to yield a down sampled output 518. In some embodiments of the present invention, the down sampling is a 2× down sampling. Down sampling circuit 516 may implement any approach known in the art for down sampling an input data set. Down sampled output 518 is provided to a filtering circuit that applies a low pass digital filtering algorithm to the input to yield a sampled output 523. In some embodiments of the present invention, the down sampling and the low pass digital filtering algorithm are applied by the same circuit (i.e., a combination of down sampling circuit 516 and filtering circuit 521).

Filtered output 523 is provided to both an integer delay circuit 531 and a phase detection circuit 526. Phase detection circuit 526 detects a phase of filtered output 523, and provides the detected phase as a first phase 528. Phase detection circuit 523 may be any circuit known in the art that is capable of identifying the phase of a digital signal. Based upon the disclosure provided herein, one of ordinary skill in the art will recognize a variety of phase detection circuits that may be used in relation to different embodiments of the present invention. Integer delay circuit 531 delays filtered output 523 by a second delay to yield a second delayed output 533.

The first delay and the second delay are chosen such that first delayed output 532 and second delayed output 533 are aligned within one sampling period. Selection of the first delay and the second delay are based at least in part on the down track distance between a read head providing first input 508 and a read head providing second output 509. In some cases, integer delay circuit 531 may be eliminated and all adjustment to align first delayed output 532 with second delayed output 533 being done by integer delay circuit 530. Such an approach assumes that first input 508 is guaranteed to come from a leading read head (e.g., read head 194) and second input 509 is guaranteed to come from a lagging read head (e.g., read head 196).

A source selector circuit 535 selects one of first delayed output 532 or first delayed output 533 as having a leading phase relative to the phase of the other. Determination of the relative phase status of first delayed output 532 and second phase output 533 is determined by comparing first phase 527 with second phase 528. Source selector circuit 535 provides the one of first delayed output 532 or second delayed output 533 with the leading fractional phase (i.e., a fractional difference in phase) as a leading phase output 537, and provides the other of first delayed output 532 or second delayed output 533 as a lagging phase output 538. Leading phase output 537 is provided to a fixed interpolation circuit 540 that interpolates the input by a phase shift amount to yield an aligned output 541. The phase shift amount is the magnitude of the difference between first phase 527 and second phase 528. Fixed interpolation circuit 540 may be any circuit known in the art that is capable of interpolating an input to yield a phase modified output.

Aligned output 541 is added to lagging phase output 538 by a summation circuit 545 to yield an aggregated output 547. Such summation effectively averages first input 508 with second input 509 and thereby reduces the effect of any uncorrelated noise evident on one or the other of lagging phase output 538 and aligned output 541. Aggregated output 547 is provided to an equalizer circuit 570 that applies an equalization algorithm to the input to yield an equalized output 572. In some embodiments of the present invention, equalizer circuit 570 is a digital finite impulse response circuit as is known in the art.

Equalized output 572 is provided to a multi-phase interpolator circuit 575 that interpolates equalized output 572 guided by a peak track output 513 to yield a peak output 577. In one particular embodiment of the present invention, multi-phase interpolator circuit 575 is an eight phase interpolator circuit that compares eight phases for each sampling period of the analog to digital conversion circuitry and determines which of the phases yields a peak amplitude of the preamble data. The phase yielding the peak amplitude of the preamble data is provided as peak output 577. Peak output 577 is processed by a processing circuit 580. Processing circuit 580 queries peak output 577 to yield a SAM Found signal 582 corresponding to the location of a sector address mark in peak output 577, processes peak output 577 to yield a Gray output 584, and processes peak output 577 to yield an output 586. Processing to yield SAM found signal 582, Gray output 584, and repeat run out (RRO) output 586 may be done using any processing circuit known in the art that is capable of processing respective portions of servo data corresponding to a sector address mark, gray code, and repeat run out data.

A phase averaging circuit 514 averages first phase 527 with second phase 528 to yield an average phase 524. The continuously averaged value of average phase 524 is provided to a peak tracking circuit 507 that selects the different interpolation points used by multi-phase interpolator circuit 575. The interpolation points are provided as peak track output 513. Not only will the averaging improve the signal to noise ratio of a sliding phase estimate, but the fact that the two heads will slide over the sector address mark fields in the spiral waveform at different times will further help to reduce the anomalies typically associated with the single head system when it slides over the same sector address mark fields.

System 500 additionally includes a source selector circuit 550 that selects one of sampled output 522 or sampled output 523 as a leading output 552, and the other of sampled output 522 or sampled output 523 as a lagging output 553. The selection applied by source selector circuit 550 corresponds to the selection made by source selector circuit 535. In particular, where source selector circuit 535 selects first delayed output 532 corresponding to first input 508 as leading phase output 537, source selector circuit 550 selects sampled output 522 corresponding to first input 508 as leading output 552. Alternatively, where source selector circuit 535 selects second delayed output 533 corresponding to second input 509 as leading phase output 538, source selector circuit 550 selects sampled output 523 corresponding to second input 509 as leading output 553.

A burst interpolation and integration circuit 555 applies burst interpolation and integration processing to generate a primary path burst output 557. The burst processing may be performed using any circuit known in the art for processing burst information from servo data. Another burst interpolation and integration circuit 560 applies the same synchronization and burst processing applied by burst interpolation and integration circuit 555 to generate a secondary path burst output 562. Again, the burst processing may be performed using any circuit known in the art for processing burst information from servo data. As the burst data is used to indicate an offset from a centerline of a track, averaging data sets derived from different offsets from the centerline effectively undermines the burst data. For this reason, the burst processing is performed on independent data sets derived from respective ones of first input 508 and second input 509, and results in independent burst outputs. Primary path burst output 557 and secondary path burst output 562 are provided to a host (not shown) that uses the information to adjust the location of a read/write head assembly (not shown) relative to sensed tracks (not shown). It should be noted that while the embodiment shows data path independent burst processing that other embodiments of the present invention may provide for the two burst integration/interpolation phases to be set using an averaged phase from the two heads along with the head offset estimate to set them differently but dependent on both the averaged phase and the offset estimate.

Additionally, system 500 includes secondary sector address mark detection circuitry that includes a selector circuit 590, an equalizer circuit 594, and interpolation circuit 598, and a SAM detection circuit 503. Selector circuit 590 selects one of sampled output 522 or sampled output 523 as a secondary SAM output 592. The selection applied by selector circuit 590 may be made consistent with the selection applied by source selector circuit 535. In particular, where source selector circuit 535 selects first delayed output 532 corresponding to first input 508 as leading phase output 537, selector circuit 590 selects sampled output 522 corresponding to first input 508 as secondary SAM output 592. Alternatively, where source selector circuit 535 selects second delayed output 533 corresponding to second input 509 as leading phase output 538, selector circuit 590 selects sampled output 523 corresponding to second input 509 as secondary SAM output 592. In other embodiments, one of sampled output 522 or sampled output 523 may be selected as secondary SAM output 592 based upon another selection criteria.

An equalizer circuit 594 applies an equalization algorithm to secondary SAM output 592 to yield an equalized output 596. In some embodiments, equalizer circuit 594 is a digital finite impulse response circuit as is known in the art. Equalized output 596 is provided to an interpolator circuit 598 that is operable to interpolate equalizer output 596 to yield an interpolated output 501. The interpolation operates to interpolate equalized input 596 to correspond to the peaks of the preamble of the received data samples. Interpolator circuit 598 may be implemented using a multi-phase interpolator circuit similar to multi-phase interpolator circuit 575. Based upon the disclosure provided herein, one of ordinary skill in the art will recognize a variety of interpolation algorithms that may be used in relation to different embodiments of the present invention. Interpolated output 501 is provided to a SAM detection circuit 503. SAM detection circuit 503 applies a sector address mark detection to interpolated output 501 to yield a secondary SAM found output 505. SAM detection circuit 503 may be any circuit known in the art that is capable of detecting a sector address mark in a servo data stream.

SAM found 582 and secondary SAM found output 505 are provided to a SAM location identification circuit 566. SAM location identification circuit 566 compares SAM found 582 with secondary SAM found output 505 to determine whether they indicate different locations for the sector address mark in the servo data. Where the same locations of the sector address mark are indicated by the comparison of SAM found 582 and secondary SAM found output 505, SAM found 582 is provided as an updated SAM found 568. Alternatively, where different locations of the sector address mark are indicated by the comparison of SAM found 582 and secondary SAM found output 505, one of SAM found 582 or secondary SAM found output 505 is selected as updated SAM found 568. For example, one of SAM found 582 or secondary SAM found output 505 that indicates a location closest to where the sector address mark was expected in the servo data may be selected and provided as updated SAM found 568 and used as the location of the sector address mark. Alternatively, each of processing circuit 580 and SAM detection circuit 503 may be modified to generate a SAM quality indicator, and the one of SAM found 582 or secondary SAM found output 505 that exhibits the highest quality is provided as updated SAM found 568. The quality may be based upon one or more of the following: a number of bits in SAM found 582 and secondary SAM found output 505 that are in error. If the sector address mark detection utilizes Viterbi algorithm detection, the Viterbi metrics may be used to select the highest quality sector address mark indicated by SAM found 582 and secondary SAM found output 505. Alternatively, flawscan and/or quality of preamble field may be used to select one of SAM found 582 or secondary SAM found output 505 as updated SAM found 568.

On an initial power up, the offset between two read heads may be unknown. Thus, both the integer and fractional phase offsets between the two read heads will need to be determined and tracked over spiral tracks in order to utilize the signals from both read heads. Similar to normal servo processing, the integer offset between the two read heads will be determined by simply measuring the number of clock periods between the SAM found signals generated from the two read heads. If two SAM detection circuits are included as shown in FIG. 5, then while determining the integer offset between the two read heads the primary SAM detector circuit (i.e., the SAM detector circuit included in processing circuit 580) would be connected to the leading head without any signal combining and the lagging head would be connected to the simplified second SAM detector circuit (i.e., SAM detection circuit 503). Typically there are approximately three to six sector address marks that are detected within a single spiral event so registers will be provided to store these results for both paths. Firmware could then read the multiple results and determine what the offset is, or a hardware circuit could be designed to perform the same function. Note that these time stamps also include a fractional phase value which is generated from the sliding phase values at the time the sector address mark is detected. Once the integer and approximate phase offset is known the sliding phase results may be continually monitored to refine and track the head offset across the stroke.

Figure 6:
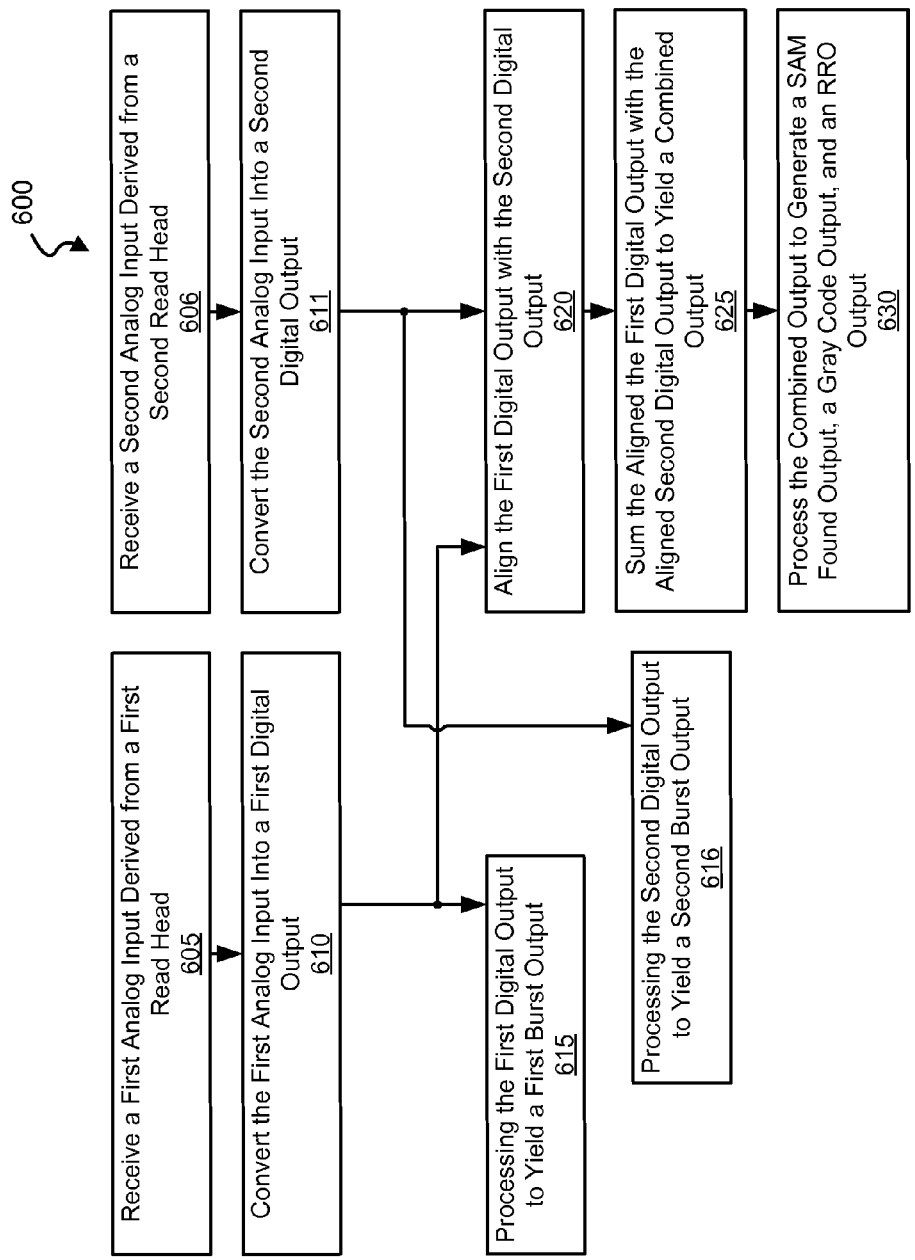
FIG. 6 is a flow diagram showing a method in accordance with some embodiments of the present invention for synchronizing to information on a storage medium using information derived from multiple read heads.

Turning to FIG. 6, a flow diagram 600 shows a method in accordance with some embodiments of the present invention for synchronizing to information on a storage medium using information derived from multiple read heads. Following flow diagram 600, a first analog input is derived from a first read head (block 605). The first read head is disposed in relation to a storage medium that stores servo data. The servo data may be arranged either radially across tracks on the storage medium or spirally across tracks on the storage medium. The first analog input is converted to a first digital sample (block 610). The conversion may be done using a first analog to digital converter circuit. Similarly, a second analog input is derived from a second read head (block 606). The second read head is disposed in relation to the storage medium that stores the servo data. The second analog input is converted to a second digital sample (block 611). The conversion may be done using a second analog to digital converter circuit.

The first digital output is processed to yield a first burst output that indicates an alignment of the first read head relative to the center line of a track on the storage medium (block 615). The processing may include any burst data processing approach known in the art. The second digital output is processed to yield a second burst output that indicates an alignment of the second read head relative to the center line of a track on the storage medium (block 616). Again, the processing may include any burst data processing approach known in the art.

The first digital output is aligned with the second digital output (block 620). This alignment may include both an integer alignment (i.e., aligning to within the same sample period), and fractional alignment (i.e., alignment to within the same fractional portion of the sample period). The aligned data sets are then summed to yield a combined output (block 625). This combined output is then processed to generate a SAM found output, a Gray code output, and an RRO output (block 630). Generation of the SAM found output may be done using any sector address mark detection circuitry or approach known in the art. Generation of the Gray code output may be done using any Gray code processing circuitry or approach known in the art. Generation of the RRO output may be done using any RRO processing circuitry or approach known in the art.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
   a first input processing circuit operable to provide a first data set from information received from a first read head, wherein the first data set includes a first instance of a first portion of the information and a first instance of a second portion of the information;
   a second input processing circuit operable to provide a second data set from information received from a second read head, wherein the second data set includes a second instance of the first portion of the information and a second instance of the second portion of the information;
   a combining circuit operable to combine an aligned output with the second instance of the first portion to yield a combined signal, wherein the aligned output is derived from the first instance of the first portion of the information;
   a first processing circuit operable to process the combined signal to yield a first status output; and a second processing circuit operable to process the first instance of the second portion of the information to yield a second status output.

2. The data processing system of claim 1, wherein the data processing system further comprises:
an alignment circuit operable to align the first instance of the first portion of the information and the second instance of the first portion of the information to yield the aligned output.

3. The data processing system of claim 2, wherein the data processing system further comprises:
a first phase detection circuit operable to determine a phase of the first data set;
a second phase detection circuit operable to determine a phase of the second data set; and
wherein the alignment circuit uses a difference between the phase of the first data set and the phase of the second data set.

4. The data processing system of claim 3, wherein the data processing system further comprises:
a phase averaging circuit operable to average the first phase and the second phase to yield an average phase; and
wherein the first processing circuit includes a multi-phase interpolator circuit operable to track a peak of the combined signal based at least in part on the average phase.

5. The data processing system of claim 4, wherein the first data set and the second data set are derived from a spiral self write servo data on a storage medium.

6. The data processing system of claim 1, wherein the data processing system further comprises:
a third processing circuit operable to process the second instance of the second portion of the information to yield a third status output.

7. The data processing system of claim 6, wherein the second portion of the information includes a burst field of a servo data set on a storage medium, and wherein the third status indicates an alignment of the second read head relative to a track on the storage medium.

8. The data processing system of claim 1, wherein the second portion of the information includes a burst field of a servo data set on a storage medium, and wherein the second status indicates an alignment of the first read head relative to a track on the storage medium.

9. The data processing system of claim 1, wherein the first portion of the information includes at least one of a sector address mark, a Gray code, and a repeat run out field; and wherein the first status output is selected from a group consisting of: a sector address mark found output, a Gray code output, and a repeat run out output.

10. The data processing system of claim 1, wherein the first portion of the information includes a sector address mark, wherein the first status output is a first sector address mark found output, and wherein the system further comprises:
a third processing circuit operable to process one of the first data set or the second data set to yield a second sector address mark.

11. The data processing system of claim 1, wherein the combining circuit includes a summation circuit operable to add the aligned output to the second instance of the first portion to yield the combined signal.

12. The data processing system of claim 1, wherein the data processing system is implemented as part of a storage device, wherein the storage device comprises:
a storage medium operable to store servo data, wherein the information received from the first read head and the information received from the second read head includes the servo data; and
a read/write head assembly disposed in relation to the storage medium, wherein the read/write head assembly includes the first read head and the second read head.

13. The data processing system of claim 12, wherein the servo data is arranged radially across tracks on the storage medium.

14. The data processing system of claim 12, wherein the servo data is arranged spirally across tracks on the storage medium.

15. The data processing system of claim 1, wherein the system is implemented as an integrated circuit.

16. A method for synchronizing to information on a storage medium, the method comprising:
receiving a first data set corresponding to information received from a first read head, wherein the first data set includes a first instance of a first portion of the information and a first instance of a second portion of the information;
receiving a second data set corresponding to information received from a second read head, wherein the second data set includes a second instance of the first portion of the information and a second instance of the second portion of the information;
aligning the first instance of the first portion with the second instance of the first portion using an alignment circuit;
combining the aligned first instance of the first portion with the aligned second instance of the second portion to yield a combined signal;
processing the combined signal to yield a status output selected from a group consisting of: a sector address mark, a Gray code output, and a repeat run out output; and
processing the first instance of the second portion of the information to yield a burst output that indicates an alignment of the first read head relative to a track on a storage medium.

17. The method of claim 16,
determine a phase of the first data set;
determine a phase of the second data set; and
wherein aligning the first instance of the first portion with the second instance of the first portion is done based in part on a difference between the phase of the first data set and the phase of the second data set.

18. The method of claim 16, wherein the information received from the first read head and the information received from the second read head includes servo data, wherein the first portion of the information corresponds to a first portion of the servo data, and wherein the second portion of the information corresponds to a second portion of the servo data.

19. The method of claim 18, wherein the servo data is arranged on a storage medium in a manner selected from a group consisting of: radially across tracks on the storage medium, and spirally across tracks on the storage medium.

20. A hard disk drive, the hard disk drive comprising:
a disk platter including a number of tracks each storing servo data
a head assembly disposed in relation to the disk platter, wherein the head assembly includes a first read head and a second read head;
a data processing system including:
a first input processing circuit operable to provide a first data set from information received from the first read head, wherein the first data set includes a first instance of a first portion of the information and a first instance of a second portion of the information;

a second input processing circuit operable to provide a second data set from information received from the second read head, wherein the second data set includes a second instance of the first portion of the information and a second instance of the second portion of the information;

a combining circuit operable to combine an aligned output with the second instance of the first portion to yield a combined signal, wherein the aligned output is derived from the first instance of the first portion of the information;

a first processing circuit operable to process the combined signal to yield a first status output; and a second processing circuit operable to process the first instance of the second portion of the information to yield a second status output.

\* \* \* \* \*